US011923164B2

(12) United States Patent
Henricks

(10) Patent No.: US 11,923,164 B2
(45) **Date of Patent: *Mar. 5, 2024**

(54) CIRCUIT PROTECTOR ARC FLASH REDUCTION SYSTEM WITH PARALLEL CONNECTED SEMICONDUCTOR SWITCH

(71) Applicant: EATON INTELLIGENT POWER LIMITED, Dublin (IE)

(72) Inventor: Michael Henricks, Ellisville, MO (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/358,848

(22) Filed: Jun. 25, 2021

(65) Prior Publication Data

US 2021/0319969 A1 Oct. 14, 2021

Related U.S. Application Data

(63) Continuation of application No. 15/976,209, filed on May 10, 2018, now Pat. No. 11,049,685.

(51) Int. Cl.
*H01H 85/38* (2006.01)
*H01H 85/18* (2006.01)

(52) U.S. Cl.
CPC ............ *H01H 85/38* (2013.01); *H01H 85/18* (2013.01); *H01H 2085/383* (2013.01)

(58) Field of Classification Search
CPC ... H01H 85/38; H01H 85/18; H01H 2085/383
USPC .......................................................... 337/273
See application file for complete search history.

(56) References Cited

U.S. PATENT DOCUMENTS 3,979,644 A 9/1976 Everhart
4,583,146 A * 4/1986 Howell .................... H01H 9/42 361/13
4,858,054 A 8/1989 Franklin
5,245,308 A * 9/1993 Herbias .................. H01H 85/38 337/276

(Continued)

FOREIGN PATENT DOCUMENTS

GB 964953 A 7/1964
JP 1259714 A 10/1989
JP 2014179189 A 9/2014

OTHER PUBLICATIONS

LCL Class L 600Vac, 300 to 6000A Time-Delay Fuses, Edison, Cooper Bussmann, Jul. 10, 2007, Form No. LCL, Data Sheet #1307, pp. 1-2.

(Continued)

*Primary Examiner* — Anatoly Vortman
(74) *Attorney, Agent, or Firm* — Baker Botts L.L.P.

(57) ABSTRACT

An arc flash mitigation system includes a main circuit protector such as a high amperage overcurrent protection fuse, and an arc flash mitigation network connected in parallel to the main circuit protector. The arc flash mitigation network includes at least one semiconductor switch operable to provide a shunt current path to a low amperage arc mitigation fuse for a faster response time to certain circuit conditions than the main circuit protector otherwise provides. The semiconductor switch may be a silicon controller rectifier operatively responsive to a voltage drop across the main circuit protector in use.

15 Claims, 3 Drawing Sheets

(56) References Cited

U.S. PATENT DOCUMENTS

| | | | | |
|---|---|---|---|---|
| 6,157,529 | A | 12/2000 | Ahuja | |
| 6,445,276 | B2 | 9/2002 | Schon et al. | |
| 8,212,646 | B2 | 7/2012 | Crane et al. | |
| 10,074,501 | B2 | 9/2018 | Johnson | |
| 11,043,344 | B2 * | 6/2021 | von zur Muehlen .. | H01H 89/00 |
| 2007/0201177 | A1 | 8/2007 | Kladar et al. | |
| 2014/0091059 | A1 * | 4/2014 | Henke ...................... | H01H 9/54 218/8 |
| 2014/0334050 | A1 | 11/2014 | Henke | |
| 2016/0276821 | A1 * | 9/2016 | Politis .................... | H02H 9/041 |
| 2022/0005663 | A1 * | 1/2022 | Henricks ................ | H01H 9/542 |

OTHER PUBLICATIONS

LCU Fast-Acting Fuses Class L 600Vac, 601 to 6000A, Edison, Cooper Bussmann, Jul. 10, 2007, Form No. LCU, Data Sheet #1308, pp. 1-2.
LimitronTm KLU Class L 600Vac, 601-4000A, time-delay fuses, Bussman Series, Eaton, Feb. 2016, pp. 1-4.
Low-PeakTm KRP-C Class L 600Vac/300Vdc, 601-2000A, time-lay fuses, Bussman Series, Eaton, Feb. 2016, bp. 1-4.

* cited by examiner

CIRCUIT PROTECTOR ARC FLASH REDUCTION SYSTEM WITH PARALLEL CONNECTED SEMICONDUCTOR SWITCH

CROSS REFERENCE TO RELATED APPLICATIONS

This application is a continuation application of U.S. patent application Ser. No. 15/976,209 filed May 10, 2018, the complete disclosure of which is hereby incorporated by reference in its entirety.

BACKGROUND OF THE INVENTION

The field of the invention relates generally to circuit protection devices, and more specifically to an arc flash reduction system for an overcurrent protection fuse.

Fuses are widely used as overcurrent protection devices to prevent costly damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current flowing through the fuse exceeds a predetermined limit, the fusible elements melt and open one or more circuits through the fuse to prevent electrical component damage.

Mitigating certain types of electrical arc flash conditions for large amperage fuses in high voltage, high current electrical power systems presents particular challenges that have yet to be completely addressed by existing arc flash reduction measures and systems. Improvements are desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Electrical power systems in industrial and commercial facilities typically operate at higher voltages and with high current than other electrical power systems. Higher voltage, higher current circuitry presents increased potential energy for electrical arcing events as an overcurrent protection fuse operates to open such circuitry and protect load-side circuits and equipment from damage that may otherwise be caused when electrical fault conditions occur. Higher voltage, higher current circuitry likewise presents a possibility of undesirable electrical arcing conditions apart from electrical fault conditions, including but not necessarily limited to service and maintenance procedures performed by electrical power system personnel in and around electrical panels and the like where circuit protectors such as overcurrent protection fuses are located. Improved arc flash mitigation features are accordingly desired from both circuit protection and safety perspectives. Method aspects will be in part apparent and in part explicitly discussed in the description below.

Figure 1:
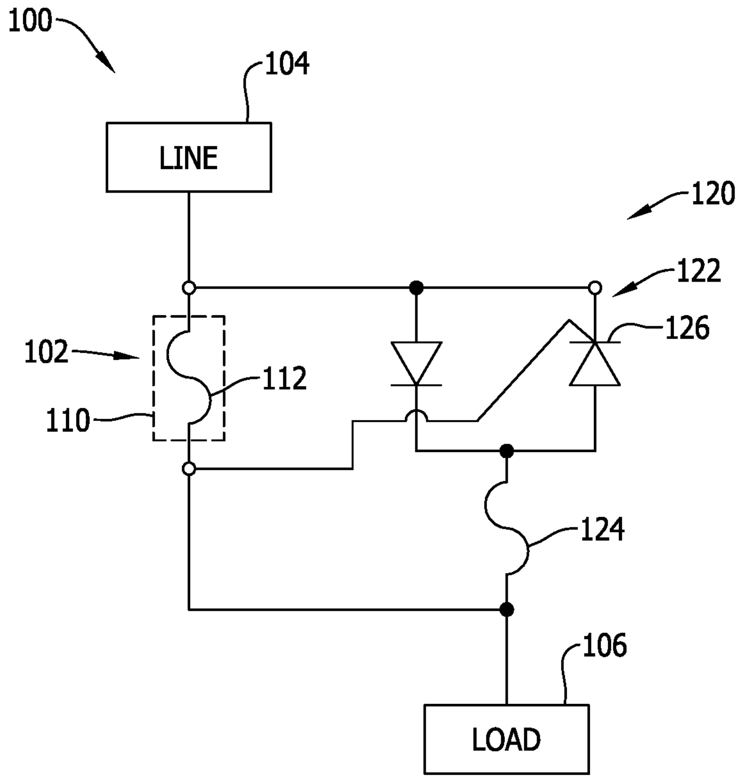
FIG. 1 is an exemplary circuit schematic of an exemplary arc flash reduction system for an exemplary overcurrent protection fuse according to the present invention.

FIG. 1 is an exemplary circuit schematic of an exemplary embodiment of a portion of an electrical power system 100 including a circuit protector such as an overcurrent protection fuse 102 completing an electrical connection between line-side circuitry 104 and load-side circuitry 106. The line-side circuitry 104 supplies high voltage, high current electrical power in the power system 100 to the load-side circuitry 106 that presents electrical arcing potential in certain current fault conditions before the fuse 102 has had time to fully open and clear the circuit. Also, the high voltage, high current electrical power in the power system 100 presents possible electrical arcing and arc flash conditions to electrical power system personnel when servicing the power system 100 in the location of the fuse 102, such as, for example, in an electrical panel, a fuse holder, or other accessory in any location desired in the electrical power system 100.

It is understood that the electrical power system 100 in a commercial or industrial facility may include many circuit protectors 102 of the same or different type to protect branch circuitry in the power system, to protect different loads 106 connected to the power system, and to meet specific needs at various different points in the electrical power system 100. Various access points to different parts of the electrical power system 100 are typically provided in different locations in the commercial or industrial facility for service and maintenance, including but not limited to inspection and/or replacement of overcurrent protection fuses. For certain service or maintenance procedures to be performed while the electrical power system is “live” or energized, electrical arcing conditions and arc flash hazards are of particular concern to electrical power system personnel that are in the vicinity of the panel. Apart from service and maintenance procedures, electrical arcing in certain circumstances can compromise the desired circuit protection when the circuit protector 102 does not or cannot act quickly enough to interrupt the circuit path between the line-side circuitry 104 and the load-side circuitry 106. While such conditions are described in the context of an overcurrent protection fuse 102, other types of circuit protectors may present similar issues.

Figure 2:
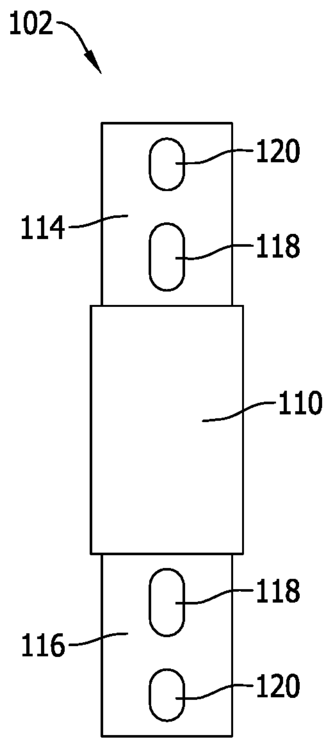
FIG. 2 is a top view of an exemplary main fuse for the arc flash reduction system shown in FIG. 1.
Figure 3:
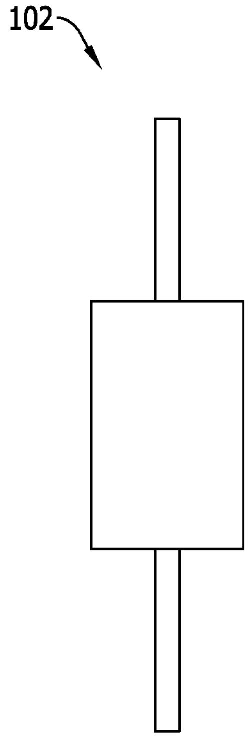
FIG. 3 is a side view of the main fuse shown in FIG. 2.

The overcurrent protection fuse 102 (separately shown in the example of FIGS. 2 and 3) includes a fuse housing 110 (shown in phantom in FIG. 1), a fuse element or fuse element assembly 112 completing a circuit path between fuse terminals 114 and 116 inside the housing 110. The fuse housing 110 in the example of FIGS. 2 and 3 is generally cylindrical with the fuse terminals 114, 116 being blade terminals extending from the opposing ends of the housing 110 and in a co-planar relationship to one another.

The blade terminals 114, 116 of the fuse 102 include respective mounting apertures 118, 120 of varying size and shape that are used to complete bolt-on connection to respective conductors of the line-side and load-side circuitry 104, 106 in the power system 100 shown in FIG. 1. When electrical current flowing through the fuse 102 from the line-side circuitry 104 to the load-side circuitry 106, and more specifically though the fuse element assembly 112, exceeds a predetermined limit, the fuse element assembly

112 melts and opens one or more circuits through the fuse to prevent electrical component damage to the load-side circuitry 106.

The fuse 102 in one contemplated embodiment is a large amperage fuse such as a known Class L fuse that is designed to meet the demands of higher voltage, higher current circuitry in the electrical power system 100 represented by the line-side circuitry 104 and the load-side circuitry 106. For example, the fuse 102 may be a Class L fuse installed in a switchboard mains and feeder circuit in the power system 100, other power distribution circuitry in the power system 100, or in a motor control center of the power system 100. In an exemplary motor control application, the fuse 102 may be a Class L fuse providing branch-circuit protection in the power supply (the line-side circuitry 104) for one or more large motors (the load side-circuitry 106), and may provide short circuit and overload protection to the motors via time delay features built-in to the fuses 102.

UL listed Class L fuses suitable for use as the fuse 102 are available from a variety of electrical fuse manufacturers, including but not necessarily limited to Eaton's Bussmann Business of St. Louis, MO. In one exemplary embodiment the fuse 102 may be a known Class L fuse having a voltage rating of about 600 VAC or less, an amperage rating of 300 A to 6000 A, and an interrupting rating of 200 kA VAC RMS Sym. In another exemplary embodiment the fuse 102 may be a known Class L fuse having a voltage rating of 600 VAC/300 VDC, an amperage rating of about 600 A to 2000 A, and an interrupting rating of 300 kA VAC RMS Sym or 100 kA VDC. Known Class L fuses may include time-delay features or may be fast acting as desired for use in the power system 100.

Such high voltage, high current loads on such Class L fuses 102 creates rather severe electrical arcing potential. While Class L fuses are engineered to contain electrical arcing inside the housing 110 as the fuse 102 operates in response to a specified fault current, electrical arcing conditions can sometimes be unpredictably severe and/or difficult to control or extinguish in certain cases. If arcing is not effectively controlled or extinguished, even for a well-designed electrical fuse 102, an undesirable release of significant amounts of concentrated radiant energy may result in a fraction of a second, resulting in an undesirable high temperature and pressure condition in the ambient environment of the fuse 102. Likewise, it is possible for electrical power system personnel to inadvertently create an electrical arcing condition when performing service and maintenance procedures while the power system 100 is "live" and the fuse 102 (and other electrical conductors and components proximate the fuse 102) are energized under the high voltage, high current load.

To mitigate arc flash concerns in the scenarios described above, an arc flash mitigation network 120 is connected in parallel to the fuse 102 to respond to electrical arcing conditions that the fuse 102 has not responded to in a desired timeframe. The arc flash mitigation network 120 in the example shown includes a semiconductor switch 122 and an arc mitigation fuse 124 connected in series to one another and in parallel to the fuse 102. In view of the fact that two overcurrent protection fuses are now present, the fuse 102 is referred to hereinafter as the "main" fuse providing primary overcurrent protection to the load-side circuitry 106 while the arc mitigation fuse 124 serves a limited, secondary role only in certain conditions as described below.

The semiconductor switch 122 in an exemplary embodiment is a silicon controlled rectifier, sometimes referred to as a thyristor, connected in parallel to the main fuse 102 such that the voltage across the main fuse 102 is input to a gate 126 of the silicon controlled rectifier 122. In normal operation, the silicon controlled rectifier 122 is off and exhibits high resistance such that all of the current present flows through the main fuse 102. As such, the arc mitigation fuse 124 is disconnected through the semiconductor switch 122 and current does not flow through the arc mitigation fuse 124.

When the voltage across the main fuse 102 reaches a predetermined level, however, the voltage applied to the gate 126 causes the silicon controlled rectifier 122 to switch on and provide a low resistance circuit path that conducts current in the parallel circuit path through the silicon controlled rectifier 122 and to the arc mitigation fuse 124. As such, the current is shunted or diverted away from the main fuse 102 and through the parallel current path by the silicon controlled rectifier 122 and to the arc mitigation fuse 124.

The arc mitigation fuse 124, in turn, is selected to have a lower amperage rating than the main fuse 102 and will respond much more quickly to the current than the main fuse 102 otherwise would or could. The faster opening of the arc mitigation fuse 124 reduces the electrical arcing potential and reduces a severity of any arc flash event that may occur while electrically isolating the load-side circuitry 106 from the line-side circuitry 104.

The semiconductor switch 122 and the arc mitigation fuse 124 may be particularly advantageous in certain overcurrent conditions wherein the main, high amperage fuse 102 by itself does not operate fast enough to minimize arc flash energy. The low amperage fuse 124 in the parallel current path that is switched on by the semiconductor switch 122 in response to the applied voltage provides a much quicker response time to reduce arc flash energy. In general, however, the arc flash mitigation network 120 is configurable to respond to any other circuit condition in which arc flash energy reduction is desired.

The high and low amperage ratings of the respective fuse 102 and the fuse 124, as well as the gate voltage needed to switch the silicon controlled rectifier 126 on, may be strategically selected in combination to optimally respond to specific overcurrent conditions that may arise in a given electrical power system 100. The arc flash mitigation network 120 is voltage dependent in view of the large amperage rating of the main fuse 102 and the corresponding high amperage current of the power system 100, and avoids complications of a current-dependent arc flash mitigation network in such a high current power system.

In a contemplated embodiment, the semiconductor switch 122 is responsive to a predetermined change in voltage drop across the main fuse 102 as applied to the gate 126 of the silicon controlled rectifier to achieve faster operation in certain voltage and current ranges that the main fuse element is slower to respond than desired from an arc flash reduction perspective. When the voltage drop reaches a certain level, the silicon controlled rectifier connected in parallel with the main fuse 102 is enabled to shunt the current through the silicon controlled rectifier for interruption via the low ampacity fuse 124 that is sized and selected to react much faster than the main fuse 102.

By selecting the voltage change that turns the semiconductor switch 122 on, the parallel current path and the arc mitigation fuse 124 may be selectively used (or not) to respond to different voltage events representing the current flowing through the main fuse 102. The semiconductor switch 122 may accordingly respond to some overcurrent conditions but not others, and may therefore complement the response time of the main fuse 102 only when needed. When not needed, the semiconductor switch 122 is off and the arc mitigation fuse 124 is electrically isolated from the current such that the main fuse 102 solely provides the circuit protection.

Figure 4:
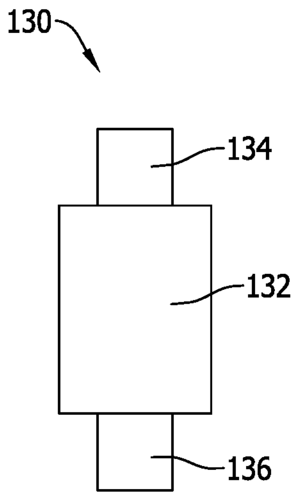
FIG. 4 is a top view of an exemplary arc flash mitigation fuse for the arc flash reduction system shown in FIG. 1.
Figure 5:
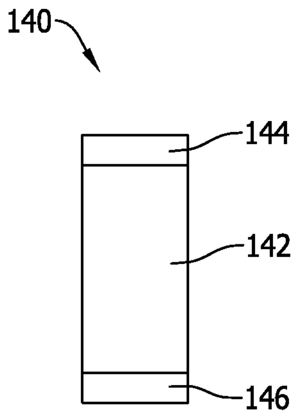
FIG. 5 is a top view of another exemplary arc flash mitigation fuse for the arc flash reduction system shown in FIG. 1.

FIGS. 4 and 5 illustrate respective arc mitigation fuses 130 and 140 that may be utilized as the arc mitigation fuse 124 in FIG. 1.

The fuse 130 includes a housing 132 and terminal blades 134, 136. The housing 132 is comparatively smaller than the housing 110 of the main fuse 102 (FIGS. 2 and 3), and the terminal blades 134, 136 in the fuse 130 are not only comparably smaller than the terminal blades 114, 116 of the main fuse 102 but the terminal blades 134, 136 do not include apertures for bolt-on connection as in the main fuse 102. The fuse element or fuse element assembly in the fuse 130 having a lower amperage rating than the main fuse 102 provides for a comparatively smaller package size than the main fuse 102. The amperage rating of the fuse 130 may be a specified fraction of the amperage rating of the main fuse, such as one half or one third. The fuse 130 may include a short circuit fuse element only, while the main fuse 102 may provide for short circuit and overload protection with time delay features.

In FIG. 5, the fuse 140 includes a housing 142 and terminals 144, 146 in the form of end caps or ferrules, and therefore does not include terminal blades like the main fuse 102 and the fuse 130. The housing 142 is comparatively smaller than the housing 110 of the main fuse 102 (FIGS. 2 and 3) and the housing 132 of the fuse 130. The fuse element or fuse element assembly in the fuse 140 having a lower amperage rating than the main fuse 102 provides for a comparatively smaller package size than the main fuse 102. The amperage rating of the fuse 140 may be a specified fraction of the amperage rating of the main fuse, such as one half or one third. The fuse 140 may include a short circuit fuse element only, while the main fuse 102 may provide for short circuit and overload protection with time delay features.

While different examples of main fuses 102 and arc mitigation fuses 130, 140 have been described, still others are possible. While exemplary voltage and current ratings of Class L fuses are described in relation to the main fuse 102 to illustrate examples of high voltage, high current demands of the electrical power system 100 that present arc flash concerns, other types and classes of main fuses 102 having similar or different voltage current ratings are possible in further and/or alternative embodiments. Likewise, arc mitigation fuses having housing or terminal structure or amperage ratings different than that shown in the drawings and described above may be used in combination with various types and classes of main fuses 102 to accomplish similar benefits.

Also, semiconductor switches other than a silicon controlled rectifier are possible in other embodiments of an arc flash mitigation network with similar effect and similar advantages. Various different types of silicon controlled rectifiers may also be used with similar effect and similar advantages. More than one silicon controlled rectifier or its equivalent may also be used in the same arc flash mitigation network 120 with more than one arc mitigation fuse in the network to provide still further variations in response times to different current conditions. In embodiments having more than one semiconductor switch in an arc flash network, the various semiconductor switches may have the same or different voltage response to switch them on and may accordingly operate in combination according to the voltage drop across the main fuse or may operate individually to different voltage drops as needed or as desired.

The benefits and advantages of the invention are now believed to have been amply illustrated in relation to the exemplary embodiments disclosed.

An embodiment of an arc flash mitigation system has been disclosed including a main circuit protector, and an arc flash mitigation network connected in parallel to the main circuit protector, wherein the arc flash mitigation network comprises at least one semiconductor switch.

Optionally, the at least one semiconductor switch is voltage dependent to provide a shunt current path parallel to the main circuit protector. At least one arc flash mitigation fuse may be connected in series with the at least one semiconductor switch. The at least one semiconductor switch may be a silicon controlled rectifier. The main circuit protector may be an overcurrent protection fuse having a first amperage rating and the at least one arc flash mitigation fuse may have second amperage rating that is a fraction of the first amperage rating. The first amperage rating is at least 300 A. The main overcurrent protection fuse may have a voltage rating of about 600 VAC or about 300 VDC.

The main circuit protector may also be adapted for bolt-on connection to an electrical power system. The main circuit protector may be a class L fuse.

Another embodiment of an arc flash mitigation system has been disclosed including a high amperage main overcurrent protection fuse, and an arc flash mitigation network connected in parallel to the main overcurrent protection fuse and responsive to a voltage across the higher amperage main overcurrent protection fuse in an electrical arcing condition. The arc flash mitigation network includes a semiconductor switch and a low amperage arc mitigation fuse connected in series with the semiconductor switch.

Optionally, the voltage dependent semiconductor switch may be a voltage dependent silicon controlled rectifier. The high amperage main overcurrent protection fuse may have an amperage rating of at least 300 A to 4000 A. The high amperage main overcurrent protection fuse may have a voltage rating of about 600 VAC or about 300 VDC. The high amperage main overcurrent protection fuse may be adapted for bolt-on connection to an electrical power system. The high amperage main overcurrent protection fuse may be a class L fuse.

An embodiment of an arc flash mitigation system has also been disclosed including a main overcurrent protection fuse having an amperage rating of at least 300 A. An arc flash mitigation network is connected in parallel to the main overcurrent protection fuse and responsive to a voltage drop across the main overcurrent protection fuse in an electrical arcing condition, wherein the arc flash mitigation network includes a silicon controlled rectifier and an arc mitigation fuse having an amperage rating substantially less than 300 A.

Optionally, the higher amperage main overcurrent protection fuse may be a class L fuse. The main overcurrent protection fuse may include terminal blades adapted for bolt-on connection to an electrical power system This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An arc flash mitigation system comprising:

a main overcurrent circuit protector providing primary overcurrent protection to an electrical load; and an arc flash mitigation network connected in parallel to the main overcurrent circuit protector, wherein the arc flash mitigation network comprises:

at least one semiconductor switch operable in response to a predetermined circuit condition to divert current away from the main overcurrent circuit protector along a shunt current path; and at least one arc flash mitigation fuse connected in series with the at least one semiconductor switch in the shunt current path;

whereby an operation of the at least one arc flash mitigation fuse by the diverted current reduces arc flash energy while servicing an energized electrical power system in a vicinity of the main overcurrent circuit protector, wherein the operation occurs before the main overcurrent circuit protector being opened by the current.

2. The arc flash mitigation system of claim 1, wherein the main overcurrent circuit protector is a main overcurrent protection fuse.

3. The arc flash mitigation system of claim 2, wherein the main overcurrent protection fuse has a first amperage rating, and wherein the at least one arc flash mitigation fuse has a second amperage rating that is lower than the first amperage rating.

4. The arc flash mitigation system of claim 3, wherein the first amperage rating is at least 300 A.

5. The arc flash mitigation system of claim 4, wherein the main overcurrent protection fuse has a voltage rating of about 600 VAC.

6. The arc flash mitigation system of claim 5, wherein the main overcurrent protection fuse has a voltage rating of about 300 VDC.

7. The arc flash mitigation system of claim 2, wherein the main overcurrent protection fuse is larger than the arc flash mitigation fuse.

8. The arc flash mitigation system of claim 2, wherein the main overcurrent protection fuse is configured to provide overload protection and short circuit protection.

9. The arc flash mitigation system of claim 8, wherein the arc mitigation fuse is configured to provide short circuit protection only.

10. The arc flash mitigation fuse of claim 2, wherein the main overcurrent protection fuse is a time delay fuse.

11. The arc flash mitigation system of claim 1, wherein the predetermined circuit condition is a threshold voltage across the main overcurrent circuit protector.

12. The arc flash mitigation system of claim 1, wherein the at least one semiconductor switch comprises a silicon controlled rectifier.

13. The arc flash mitigation system of claim 1, wherein the main overcurrent circuit protector is adapted for bolt-on connection to the electrical power system.

14. The arc flash mitigation system of claim 1, wherein the main overcurrent circuit protector is a class 1 fuse.

15. A method of mitigating an arc flash in an operation of a main overcurrent circuit protector providing primary overcurrent protection to an electrical load, the method implemented with an arc flash mitigation network connected in parallel to the main overcurrent circuit protector, wherein the arc flash mitigation network includes at least one semiconductor switch and at least one arc flash mitigation fuse connected in series with the at least one semiconductor switch in a shunt current path, wherein the method comprises:

in response to a predetermined circuit condition, operating the at least one semiconductor switch to divert current away from the main overcurrent circuit protector and to the at least one arc mitigation fuse;

whereby an operation of the at least one arc flash mitigation fuse by the diverted current reduces arc flash energy while servicing an energized electrical power system in a vicinity of the main overcurrent circuit protector, wherein the operation occurs before the main overcurrent circuit protector being opened by the current.

* * * * *